United States Patent Office

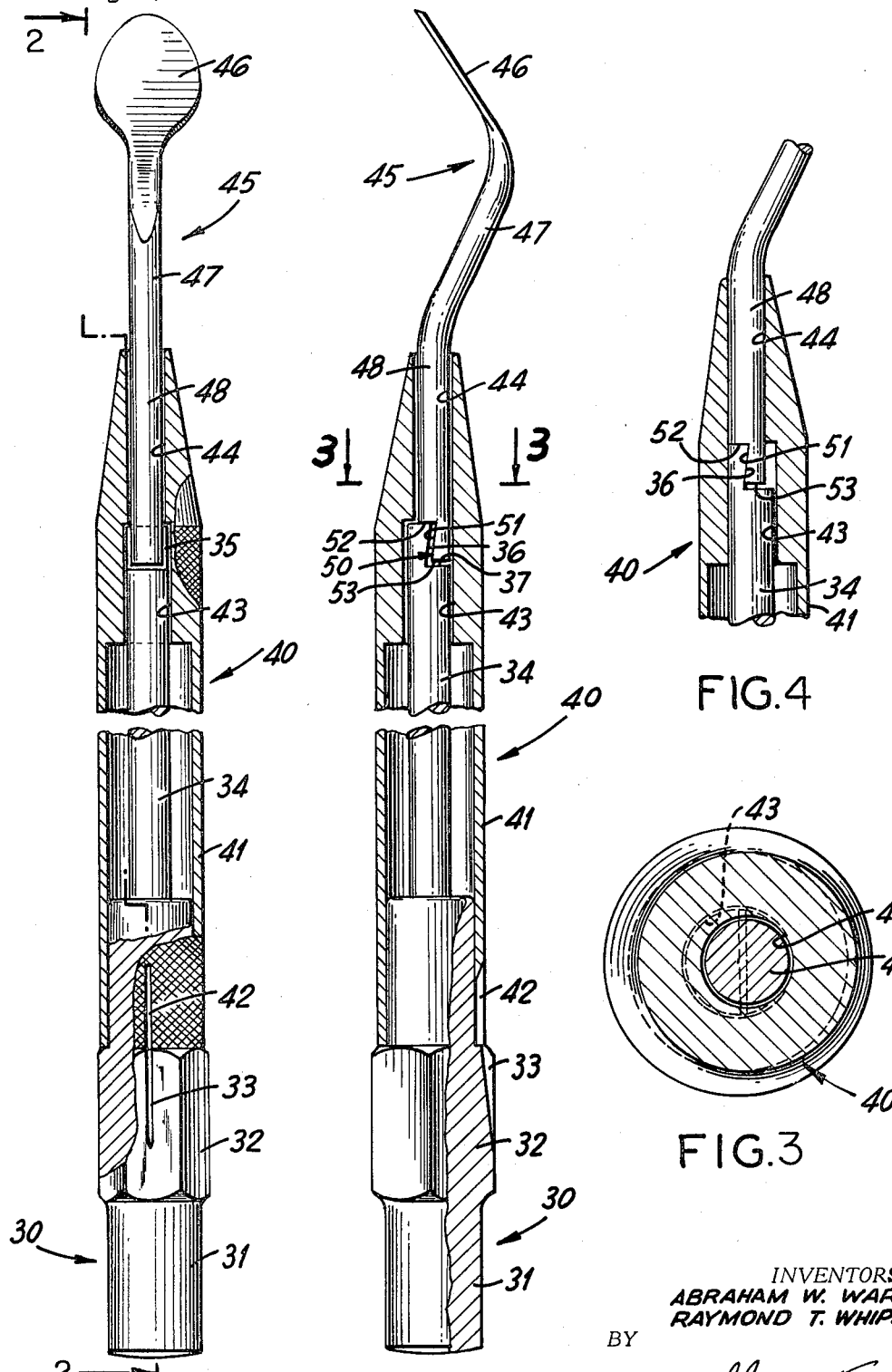

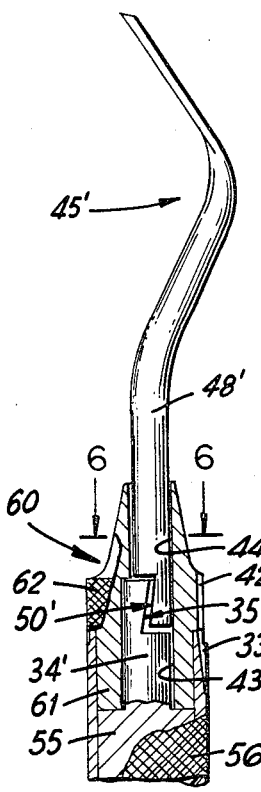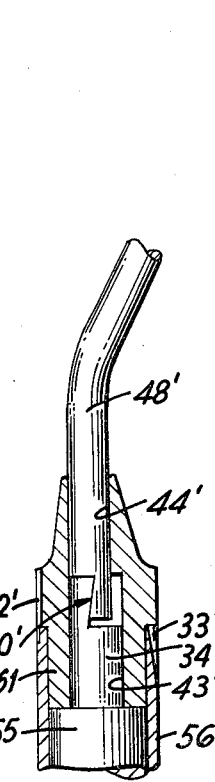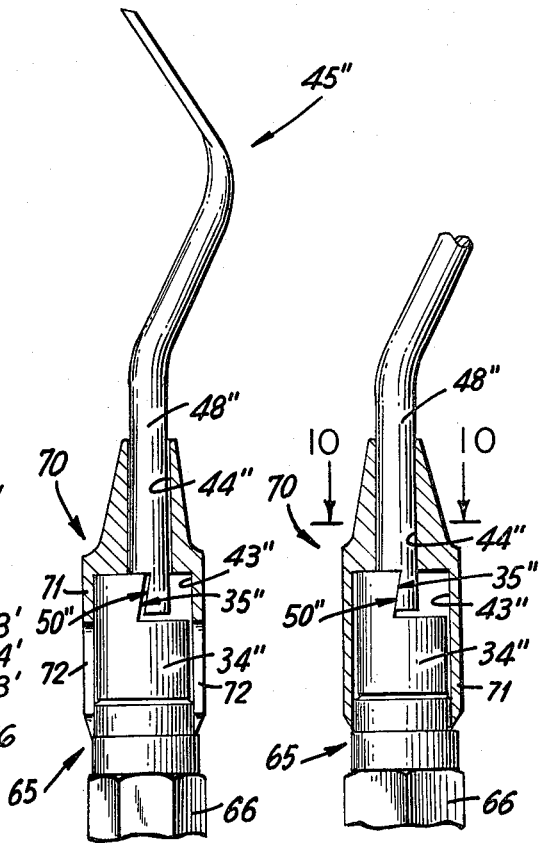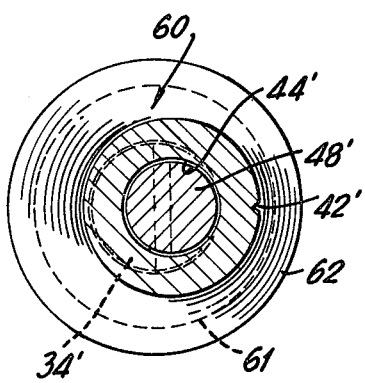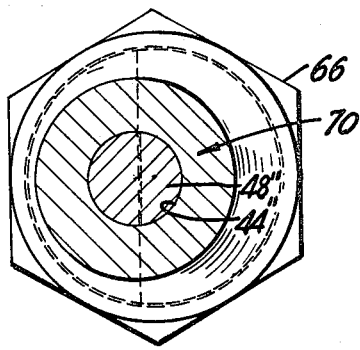

3,384,386
Patented May 21, 1968

3,384,386
SURGICAL KNIFE WITH REMOVABLE BLADE
Abraham W. Ward, 1037 Polk St., San Francisco, Calif. 94109, and Raymond T. Whipple, 673 Bille Road, Paradise, Calif. 95969
Filed Aug. 4, 1965, Ser. No. 477,135
15 Claims. (Cl. 279—89)

ABSTRACT OF THE DISCLOSURE

A novel coupling or chuck is disclosed including a first element formed with recess means having a lateral wedging surface, a second element connectable to the first element and having a shank insertable into the recess means, and with the shank having an end portion including a lateral wedging surface increasing in width toward the end of the shank, the recess means and shank having interengageable surface portions restraining the elements against relative rotation upon insertion of the shank into the recess means, and the wedging surfaces being in laterally spaced facing relation when the shank is so inserted into the recess means, and a third element rotatably engaged within the first element and operable to effect relative lateral movement of the wedging surface, without relative rotation of the first and second elements, to interengage the wedging surfaces to releasably lock the shank in the recess means.

The two wedging surfaces are substantially planar oblique surfaces of facing notches in the interfitting ends of a circular or cylindrical shank and a circular or cylindrical stem disposed in a sleeve.

Background of the invention

This invention relates to couplings or chucks, such as used, for example, in well drilling operations, machine tools, and like environments where two or more members are to be disengageably and interchangeably interconnected. More particularly, the present invention is directed to a novel coupling whereby two members may be joined in end-to-end relation by rotation of a sleeve through a relatively small angular displacement, and may be as easily disengaged by similar rotation of the sleeve in the reverse direction.

Couplings of the type to which the present invention is directed are used in many fields. For example, they can be used to interconnect pipe sections in well drilling operations, to readily and interchangeably mount tools in the head of a lathe or the like, and generally as a relatively easily lockable and disengageable chuck. A particular application of the present invention is in the field of oral surgery tools and, by the use of the novel coupling of the present invention, an oral surgery tool may be provided in which blades may be readily and interchangeably engaged and disengaged with respect to a common handle or support. Consequently, the invention will be described hereinafter as applied to a knife for use in oral surgery, but it is desired to emphasize that this is merely by way of describing a specific application of the principles of the invention, and not by way of limitation.

In a representative type of oral surgery knife to which the present invention may be adapted, the knife blade preferably is arranged in angular or oblique relation with respect to the longitudinal axis of its handle, thereby enabling the blade to be used most effectively for operations upon the gum. In its preferred form, the blade is provided with a single bevelled cutting edge, the inside surface of the blade being a planar surface and the outside surface of the blade being smoothly bevelled so that the cutting edge is coincident with the inner planar surface. This enables the blade to be sharpened very easily simply by applying the planar surface to a sharpening stone.

The cutting edges of these knives becomes worn during use, and also sometimes are broken or otherwise damaged. Consequently, in order not to interrupt an oral surgery, it is necessary that spare or extra knives be kept on hand so that, in the event of excessive wear or of damage of the knife being used, a freshly sharpened knife may be substituted. This is disadvantageous, as it requires a dentist to have a relatively large investment tied up in spare knives.

As a solution to this problem, the novel coupling of the present invention may be incorporated in a novel oral surgery tool wherein knife blades may be readily interchanged in a common handle. Thereby the only investment required, in addition to a single handle, is that necessary for a plurality of knife blades which can be readily and interchangeably used with the same handle. It is, of course, highly desirable that such interchange be effected as quickly as possible, particularly when the dentist is actually in the course of oral surgery.

In the application of the invention to this representative problem, such quick interchange is facilitated by providing novel, easily operable, interengageable wedge surface means on the shank of the knife blade and in the handle, the handle further including the rotatable sleeve of the invention coupling which, in one position, permits ready and easy insertion of the knife blade shank into the handle and, when rotated a small amount, firmly locks the knife blade against disengagement from the handle.

In one form of surgical tool incorporating the coupling of the invention, the knife blade is provided with a substantially cylindrical shank having a wedge-shaped notch at its inner end. This wedge-shaped notch is arranged to substantially mate with surfaces of a second wedge-shaped notch in the outer end of a handle element. The sleeve has one position in which a passage extending therethrough is eccentric with respect to the handle element and provides for insertion of the shank of the blade through the passage in the sleeve and into a position in which its notch is in laterally adjacent relation to the notch in the handle element. When the sleeve is partially rotated, the cooperating surfaces of the mating notch portions are brought into firm engagement with each other, and their orientation is such that the shank of the blade cannot then be withdrawn from the handle.

For an understanding of the principles of the invention, reference is made to the following description of typical embodiments thereof as illustrated in the accompanying drawings.

In the drawings:

FIG. 1 is an elevation view, partly in section, illustrating another oral surgery tool incorporating the invention coupling, with the parts being shown in the blade insertion and release position;

FIG. 2 is an elevation view, partly in section, taken on the line 2—2 of FIG. 1.

FIG. 3 is a transverse sectional view taken on the line 3—3 of FIG. 2;

FIG. 4 is a partial longitudinal sectional view, corresponding to FIG. 2, but showing the parts in the blade clamping position;

FIG. 5 is a partial longitudinal sectional view through another embodiment of oral surgery tool incorporating the invention, illustrating the parts in the blade insertion or release position;

FIG. 6 is a transverse sectional view taken on the line 6—6 of FIG. 5;

FIG. 7 is a view, similar to FIG. 5, but showing the parts in the blade clamping position;

FIG. 8 is a partial longitudinal sectional view of still another embodiment of oral surgery tool incorporating the invention, with the parts being shown in the blade insertion or release position.

FIG. 9 is a view, similar to FIG. 8, but illustrating the parts in the blade clamping position; and FIG. 10 is a transverse sectional view taken on the line 10—10 of FIG. 9.

Referring to the embodiment of the invention illustrated in FIGS. 1–4, a handle 30, arranged to receive blades interchangeably, is illustrated as having a generally cylindrical stem 31 formed with a polygonal cross section enlargement 32 intermediate its ends. One face of enlargement 32 is formed with a cut or the like providing an indicating mark 33. A relatively elongated and generally cylindrical cross section reduced diameter shank 34 extends from the end of stem 31.

The outer end of stem or shank 34 is formed with a wedge-shaped notch 35. Notch 35 is formed by taking a first cut through the outer end of shank 34 and along a plane which extends at a slight angle to the axis of shank 34 and whose outer end is substantially coincident with the axis. A second cut is made diametrically of shank 34 to intersect the first cut. This provides a sloping surface or wall 36 and a diametric surface or wall 37, so that wedge notch 35 is enlarged inwardly of shank 34.

A sleeve 40 is formed with a tubular portion 41 which embraces the end of main stem 31 outwardly of enlargement 32, and is angularly adjustable thereon. The outer surface of tubular portion 41 is preferably knurled and is formed with a cut of the like providing an indicating mark 42 which is cooperable with the indicating mark 33. The outer solid end of sleeve 40, whose exterior surface, at least in part, preferably is tapered, is formed with an inner bore 43 which is concentric or coaxial with shank 34. Just beyond the outer end of shank 34, an outer bore extends through the solid part of sleeve 40, and this outer bore is eccentric with respect to the inner bore and with respect to shank 34, in addition to being of reduced diameter relative to the bore 43. Bore 43 is, however, contiguous or tangent along one line with bore 44.

In one relative position of sleeve 40 with respect to stem 30, and as illustrated in FIGS. 2 and 3, bore 44 is offset relative to the extreme outer end of shank 34. In another relative position of sleeve 40, and stem 30, and as illustrated in FIG. 4, bore 44, or rather its theoretical extension, is contiguous with the extreme outer end of shank 34. The purpose of this will be made clear hereinafter.

A typical blade, interchangeably engageable in handle 30, is illustrated at 45 as including a relative flat knife portion 45 having at least one sharpened edge, an intermediate substantially cylindrical leg 47 and a substantially cylindrical shank 48 having a diameter of the order of that of bore 44. Knife portion 46 extends at an angle of the order of 90° relative to intermediate leg 47, and the latter extends at an angle of the order of 45° or less with respect to shank 48. The inner end of shank 48 is cut, in the same manner as described for the outer end of shank 44, to provide a wedge notch 50 having a sloping wall 51, and a diametrically extending wall 52. This wedge notch 50 is likewise wider at its base than at its end adjacent the inner end surface 53 of shank 48.

The arrangement of parts is such that, when indicating marks 33 and 42 are aligned as shown in FIG. 1, shank 48 may be inserted into bore 44 and its inner end 53 will pass, with some clearance, the outer end of stem shank 34. In particular, the inner end 53 of shank 48 and the outer end of shank 34 have a combined diametrical extent somewhat less than the diameter of bore 43. When shank 48 is so inserted through bore 44 that its notched end extends into bore 43, the parts have the position shown in FIG. 2 in which sloping surfaces or walls 36 and 51 are spaced from each other and the inner end 53 of shank 48 is spaced from the diametric wall 37 of notch 35, the diametric wall 52 of notch 50 being in engagement with the outer end of stem 34.

To lock blade 45 in position, sleeve 40 is rotated relative to stem 31 to the position shown in FIG. 4. Due to the eccentricity of bore 44 with respect to bore 43, this shifts shank 48 laterally so that sloping surfaces 36 and 52 come into firm engagement with each other. In this position, it is not possible to withdraw blade 45 from handle 30. However, the blade can be readily released by a partial turn of sleeve 40, relative to stem 31, to bring indicating marks 33 and 42 into the aligned position of FIG. 1. In this position, blade 45 may be easily removed from handle 30.

FIGS. 5, 6 and 7, illustrate a modified form of the invention in which the locking action is the same as that of the embodiment of FIGS. 1–4. Consequently, in FIGS. 8, 9 and 10, corresponding or identical parts have been given the same reference numerals primed.

Handle 55 is substantially a solid cylindrical member and a relatively short reduced diameter cylindrical cross section shank 34′ extends from the end thereof. A sleeve 56 is fixedly secured in embracing relation to handle 55 and extends beyond the large diameter portion of handle 55 toward the outer end of cylindrical shank 34′, terminating, however, somewhat short of this outer end. Sleeve 56 in cooperation with cylindrical shank 34′ thus forms an annular groove extending outwardly from the larger diameter portion of handle 55. While sleeve 56 may, if desired, be formed integral with handle 55 by machining or the like, a simpler expedient is to form the two parts separately and then secure them together as a unit, as by sweating or the like.

The annular cylindrical recess formed between shank 34′ and sleeve 56 conformingly receives a tubular extension 61 of a sleeve 60 corresponding to the sleeve 40 of FIGS. 1–4. Sleeve 60 has a larger diameter portion 62, whose outer surface is substantially flush with the outer surface of sleeve 56, and this portion 62 is knurled for easy operation. Sleeve 60 is formed with the bores 43′ and 44′ and which correspond identically to the bores 43 and 44 of the embodiment of the invention shown in FIGS. 1–4.

The other end of stem portion 34′ is formed with a notch 35′ which is substantially identical with the notch 35 of FIGS. 1–4, and similarly the inner end of shank 48′ of blade 45′ is formed with a notch 50′ substantially identical with the notch 50 of FIGS. 1–4. The operation is identical with that of the embodiment shown in FIGS. 1–4. When indicating marks 33′, on sleeve 56, and 42′, on knurled portion 62 of sleeve 60 are aligned, shank 48′ may be inserted through bore 44′ to extend into bore 43′. When sleeve 60 and stem 55 are relatively rotated, the parts are locked in position as illustrated in FIG. 7.

FIGS. 8, 9 and 10, illustrate another embodiment in which the locking principle is exactly the same as that in the embodiments of FIGS. 1–7, and therefore corresponding or identical parts have been given the same reference characters double primed.

In the embodiment shown in FIGS. 8, 9 and 10, a handle 65 is of generally polygonal cross section and is formed with a cylindrical shank 34″ which has a diameter only slightly less than the maximum lateral dimension of polygonal stem 66. This relatively large diameter cylindrical shank 34″ is embraced by a tubular extension 71 of a sleeve 70, which preferably is formed with slits 72. Sleeve 70 is rotatable upon shank 34″ but is secured against longitudinal or axial displacement relative thereto in any suitable manner. The sleeve and stem 65 may be formed with cooperating indicating marks in any desired manner, these marks corresponding to the marks 33, 33′ and 42, 42′ of the embodiments of FIGS. 1–4 and 5–7, respectively.

The tubular extensions 71 of sleeve 70 forms the bore 43″ corresponding to the bores 43 and 43′, and the solid outer end of sleeve 70 is formed with the bore 44″ corresponding to the bores 44 and 44′. The outer end of shank portion 34″ is formed with the wedge-shaped notch 35″ corresponding, except for relative size with the wedge notches 35 and 35″. Similarly, the inner end of shank 48″ of blade 45″ is formed with the notch 50″ corresponding exactly with the notches 50 and 50′. As the arrangement of FIGS. 8, 9 and 10 operates in the same manner as the arrangements of FIGS. 1–7, it is not believed that specific description thereof is necessary except to state that, in one position of stem 65 and sleeve 70, shown in FIG. 8, shank 48″ may be inserted through bore 44″ to extend into bore 43″. In the other relative angular position of stem 65 and sleeve 70, stem 48″ is locked to shank 34″ and blade 45″ may not be removed from the handle.

It will thus be seen that the present invention comprises a novel coupling or chuck whereby two rods, tubular sleeves, or the like may have their ends quickly and easily connected together and as quickly and easily disconnected from each other in an efficient manner with positive locking of the adjacent ends of the two elements to each other. Both locking and release are effected by only slight relative rotary movement or angular displacement of a sleeve. As particularly applied to oral surgery tools, machine tool chucks, and the like, the invention comprises a coupling wherein tools or blades may be interchangeably secured in a chuck or handle in an easy, quick and efficient manner with positive locking of the tool or blade in the chuck or handle. Release and interchange of tools or blades is made possible by only a slight relative rotary movement or angular displacement of a sleeve, and locking is effected in the same way.

While specific embodiments of the invention have been shown and described in detail to illustrate the application of the principles of the invention, it will be understood that the invention may be embodied otherwise without departing from such principles.

What is claimed is:

1. A coupling or chuck arrangement for quick coupling and uncoupling of elements, comprising in combination, a first member having a cylindrical portion at one end formed with a radially and axially extending first notch opening axially through said one end, said notch having a generally axially extending first surface and a diametrically extending second surface, and the axially inner edge of said first surface being radially inward of its axially outer edge to form a first wedging surface; a sleeve rotatable on said first member and having a first relatively large diameter bore concentric with and receiving said cylindrical portion, and a second relatively small diameter bore eccentric to said first bore and communicating therewith and circumferentialy contiguous with said first bore along one longitudinal generatrix; the relative diameters of said first and second bores being such that said one end of said cylindrical portion extends partially across said second bore; and a second member connectible to said first member and having a relatively elongated substantially cylindrical shank formed with a radially and axially extending first notch opening through its end, said notch having a generally axially extending third surface and a diametrically extending fourth surface, and the axially inner edge of said third surface being radially inward of its axially outer edge to form a second wedging surface; said shank having a diameter of the order of that of said second relatively small diameter bore; the relative radial dimensions of the adjacent axially outer ends of said first and second members being such that, in one angular position of said sleeve, said shank may be inserted through said second relatively small diameter bore and past the axially outer end of said cylindrical portion to engage its fourth notch surface with the outer end of said cylindrical portion and with said first and second wedging surfaces in spaced parallel relation; said sleeve being rotatable on said first member to a second angular position, with said wedging surfaces restraining relative angular displacement of said first and second members, to displace said shank laterally to firmly interengage said first and second wedging surfaces to releasably lock said shank in said first member.

2. A tool for oral surgery comprising, in combination, a relatively elongated handle having a cylindrical portion at one end formed with a radially and axially extending first notch opening axially through said one end, said notch having a generally axially extending first surface and a diametrically extending second surface, and the axially inner edge of said first surface being radially inward of its axially outer edge to form a first wedging surface; a sleeve rotatable on said handle and having a first relatively large diameter bore concentric with and receiving said cylindrical portion, and a second relatively small diameter bore eccentric to said first bore and communicating therewith and circumferentially contiguous with said first bore along one longitudinal generatrix; the relative diameters of said first and second bores being such that said one end of said cylindrical portion extends partially across said second bore; and a tool interchangeably engageable in said handle and having a relatively elongated substantially cylindrical shank formed with a radially and axially extending first notch opening through its end, said notch having a generally axially extending third surface and a diametrically extending fourth surface, and the axially inner edge of said third surface being radially inward of its axially outer edge to form a second wedging surface; said shank having a diameter of the order of that of said second relatively small diameter bore; the relative radial dimensions of the adjacent axially outer ends of said cylindrical portion of said shank being such that, in one angular position of said sleeve, said shank may be inserted through said second relatively small diameter bore and past the axially outer end of said cylindrical portion to engage its fourth notched surface with the outer end of said cylindrical portion and with said first and second wedging surfaces in spaced parallel relation; said sleeve being rotatable on said handle to a second angular position with said wedging surfaces restraining relative angular displacement of said handle and said tool, to displace said shank laterally to firmly interengage said first and second wedging surfaces to releasably lock said shank in said handle.

3. A tool for oral surgery comprising, in combination, a relatively elongated handle having a cylindrical portion at one end formed with a radially and axially extending first notch opening axially through said one end, said notch having a generally axially extending first surface and a diametrically extending second surface, and the axially inner edge of said first surface being radially inward of its axially outer edge to form a first wedging surface; a sleeve rotatable on said handle and having a first relatively large diameter bore concentric with and receiving said cylindrical portion, and a second relatively small diameter bore eccentric to said first bore and communicating therewith and circumferentially contiguous with said first bore along one longitudinal generatrix; the relative diameters of said first and second bores being such that said one end of said cylindrical portion extends partially across said second bore; and a tool interchangeably engageable in said handle and having a relative elongated substantially cylindrical shank formed with a radially and axially extending first notch opening through its end, said notch having a generally axially extending third surface and a diametrically extending fourth surface, and the axially inner edge of said third surface being radially inward of its axially outer edge to form a second wedging surface; said shank having a diameter of the order of that of said second relatively small diameter bore; the relative radial dimensions of the adjacent axially outer ends of said cylindrical portion and said shank, being such that, in one angular position of said sleeve, said shank may be inserted through said second relatively small diameter bore and past the axially outer end of said cylindrical portion to engage its fourth notched surface with the outer end of said cylindrical portion and with said first and second wedging surfaces in spaced parallel relation; said sleeve being rotatable on said handle to a second angular position, with said wedging surfaces restraining relative angular displacement of said handle and said tool, to displace said shank laterally to firmly interengage said first and second wedging surfaces to releasably lock said shank in said handle; the axial depth of said second notch being less than the axial depth of said first notch whereby the inner end of said shank is spaced from said second surface of said first notch when said shank and said cylindrical portion are interengaged.

4. A tool for oral surgery comprising, in combination, a relatively elongated handle having a cylindrical portion at one end formed with a radially and axially extending first notch opening axially through said one end, said notch having a generally axially extending first surface and a diametrically extending second surface, and the axially inner edge of said first surface being radially inward of its axially outer edge to form a first wedging surface; a sleeve rotatable on said handle and having a first relatively large diameter bore concentric with and receiving said cylindrical portion, and a second relatively small diameter bore eccentric to said first bore and communicating therewith and circumferentially contiguous with said first bore along one longitudinal generatrix; the relative diameters of said first and second bores being such that said one end of said cylindrical portion extends partially across said second bore; a tool interchangeably engageable in said handle and having a relatively elongated substantially cylindrical shank formed with a radially and axially extending first notch opening through its end, said notch having a generally axially extending third surface and a diametrically extending fourth surface, and the axially inner edge of said third surface being radially inward of its axially outer edge to form a second wedging surface; said shank having a diameter of the order of that of said second relatively small diameter bore; the relative radial dimensions of the adjacent axially outer ends of said cylindrical portion and said shank being such that, in one angular position of said sleeve, said shank may be inserted through said second relatively small diameter bore and past the axially outer end of said cylindrical portion to engage its fourth notched surface with the outer end of said cylindrical portion and with said first and second wedging surfaces in spaced parallel relation; said sleeve being rotatable on said handle to a second angular position, with said wedging surfaces restraining relative angular displacement of said handle and said tool, to displace said shank laterally to firmly interengage said first and second wedging surfaces to releasably lock said shank in said handle; and cooperating indicia on the external surface of said sleeve and of said handle aligned when said sleeve is in the position in which said shank may be inserted into and extracted from said sleeve.

5. A coupling or chuck arrangement for quick coupling and uncoupling of elements, comprising in combination, a first member having a cylindrical portion at one end formed with a radially and axially extending first notch opening axially through said one end, said notch having a generally axially extending first surface and a diametrically extending second surface, and the axially inner edge of said first surface being radially inward of its axially outer edge to form a first wedging surface; a sleeve rotatable on said first member and having a first relatively large diameter bore concentric with and receiving said cylindrical portion, and a second relatively small diameter bore eccentric to said first bore and communicating therewith and circumferentially contiguous with said first bore along one longitudinal generatrix; the relative diameters of said first and second bores being such that said one end of said cylindrical portion extends partially across said second bore; and a second member connectible to said first member and having a relatively elongated substantially cylindrical shank formed with a radially and axially extending first notch opening through its end, said notch having a generally axially extending third surface and a diametrically extending fourth surface, and the axially inner edge of said third surface being radially inward of its axially outer edge to form a second wedging surface; said shank having a diameter of the order of that of said second relatively small diameter bore; the relative radial dimensions of the axially outer ends of said cylindrical portion and said shank being such that, in one angular position of said sleeve, said shank may be inserted through said second relatively small diameter bore and past the axially outer end of cylindrical portion to engage its fourth notched surface with the outer end of said cylindrical portion and with said first and second wedging surfaces in spaced parallel relation; said sleeve being rotatable on said handle to a second angular position, with said wedging surfaces restraining relative angular displacement of said first and second members, to displace said shank laterally to firmly interengage said first and second wedging surfaces to releasably lock said shank in said handle; said cylindrical portion comprising a relatively elongated small diameter stem extending from such one end of said first member; said sleeve having a tubular inner end embracing said first member and a relatively solid outer end formed with said first and second bores.

6. A tool for oral surgery comprising, in combination, a relatively elongated handle having a cylindrical portion at one end formed with a radially and axially extending first notch opening axially through said one end, said notch having a generally axially extending first surface and a diametrically extending second surface, and the axially inner edge of said first surface being radially inward of its axially outer edge to form a first wedging surface; a sleeve rotatable on said handle and having a first relatively large diameter bore concentric with and receiving said cylindrical portion, and a second relatively small diameter bore eccentric to said first bore and communicating therewith and circumferentially contiguous with said first bore along one longitudinal generatrix; the relative diameters of said first and second bores being such that said one end of said cylindrical portion extends partially across said second bore; and a tool interchangeably engageable in said handle and having a relatively elongated substantially cylindrical shank formed with a radially and axially extending first notch opening through its end, said notch having a generally axially extending third surface and a diametrically extending fourth surface, and the axially inner edge of said third surface being radially inward of its axially outer edge to form a second wedging surface; said shank having a diameter of the order of that of said second relatively small diameter bore; the relative radial dimensions of the axially outer ends of said handle and said tool being such that, in one angular position of said sleeve, said shank may be inserted through said second relatively small diameter bore and past the axially outer end of said cylindrical portion to engage its fourth notched surface with the outer end of said cylindrical portion and with said first and second wedging surfaces in spaced parallel relation; said sleeve being rotatable on said handle to a second angular position, with said wedging surfaces restraining relative angular displacement of said handle and said tool, to displace said shank laterally to firmly interengage said first and second wedging surfaces to releasably lock said shank in said handle; said cylindrical portion comprising a relatively elongated small diameter stem extending from such one end of said handle; said sleeve having a tubular inner end embracing said handle and a relatively solid outer end formed with said first and second bores.

7. A tool for oral surgery comprising, in combination, a relatively elongated handle having a cylindrical portion at one end formed with a radially and axially extending first notch opening axially through said one end, said notch having a generally axially extending first surface and a diametrically extending second surface, and the axially inner edge of said first surface being radially inward of its axially outer edge to form a first wedging surface; a sleeve rotatable on said handle and having a first relatively large diameter bore concentric with and receiving said cylindrical portion, and a second relatively small diameter bore eccentric to said first bore and communicating therewith and circumferentially contiguous with said first bore along one longitudinal generatrix; the relative diameters of said first and second bores being such that said one end of said cylindrical portion extends partially across said second bore; and a tool interchangeably engageable in said handle and having a relatively elongated substantially cylindrical shank formed with a radially and axially extending first notch opening through its end, said notch having a generally axially extending third surface and a diametrically extending fourth surface, and the axially inner edge of said third surface being radially inward of its axially outer edge to form a second wedging surface; said shank having a diameter of the order of that of said second relatively small diameter bore; the relative radial dimensions of the axially outer ends of said handle and said tool being such that, in one angular position of said sleeve, said shank may be inserted through said second relatively small diameter bore and past the axially outer end of said cylindrical portion to engage its fourth notched surface with the outer end of said cylindrical portion and with said first and second wedging surfaces in spaced parallel relation; said sleeve being rotatable on sand handle to a second angular position, with said wedging surfaces restraining relative angular displacement of said handle and said tool, to displace said shank laterally to firmly interengage said first and second wedging surfaces to releasably lock said shank in said handle; said cylindrical portion comprising a relatively elongated relatively small diameter stem extending from such one end of said handle; said sleeve having a tubular inner end embracing said handle and a relatively solid outer end formed with said first and second bores; said handle having an enlarged portion abutting the inner end of said sleeve, and said enlarged portion and the inner end of said sleeve being formed with cooperating indicia aligned when said sleeve is in a position providing for insertion of said shank into said sleeve and removal of said shank from said sleeve.

8. A coupling or chuck arrangement for quick coupling and uncoupling of elements, comprising in combination, a first member having a cylindrical portion at one end formed with a radially and axially extending first notch opening axially through said one end, said notch having a generally axially extending first surface and a diametrically extending second surface, and the axially inner edge of said first surface being radially inward of its axially outer edge to form a first wedging surface; a sleeve rotatable on said handle and having a first relatively large diameter bore concentric with and receiving said cylindrical portion, and a second relatively small diameter bore eccentric to said first bore and communicating therewith and circumferentially contiguous with said first bore along one longitudinal generatrix; the relative diameters of said first and second bores being such that said one end of said cylindrical portion extends partially across said second bore; a second member connectible to said first member and having a relatively elongated substantially cylindrical shank formed with a radially and axially extending first notch opening through its end, said notch having a generally axially extending third surface and a diametrically extending fourth surface, and the axially inner edge of said third surface being radially inward of its axially outer edge to form a second wedging surface; said shank having a diameter of the order of that of said second relatively small diameter bore; the relative radial dimensions of the axially outer ends of said handle and said tool being such that, in one angular position of said sleeve, said shank may be inserted through said second relatively small diameter bore and past the axially outer end of said cylindrical portion to engage its fourth notched surface with the outer end of said cylindrical portion and with said first and second wedging surfaces in spaced parallel relation; said sleeve being rotatable on said first member to a second angular position, with said wedging surfaces restraining relative angular displacement of said handle and said tool, to displace said shank laterally to firmly interengage said first and second wedging surfaces to releasably lock said shank in said first member; said cylindrical portion having a substantially reduced diameter as compared to the lateral extent of the remainder of said first member; and sleeve means on said first member extending from said one end and terminating at substantially the second surface of said first notch, said sleeve means forming, with said cylindrical portion, a cylindrical recess; said sleeve having a reduced external diameter inner end conformingly fitting in said recess, and having a larger diameter portion abutting the outer end of said sleeve means.

9. A tool for oral surgery comprising, in combination, a relatively elongated handle having a cylindrical portion at one end formed with a radially and axially extending first notch opening axially through said one end, said notch having a generally axially extending first surface and a diametrically extending second surface, and the axially inner edge of said first surface being radially inward of its axially outer edge to form a first wedging surface; a sleeve rotatable on said handle and having a first relatively large diameter bore concentric with and receiving said cylindrical portion, and a second relatively small diameter bore eccentric to said first bore and communicating therewith and circumferentially contiguous with said first bore along one longitudinal generatrix; the relative diameters of said first and second bores being such that said one end of said cylindrical portion extends partially across said second bore; a tool interchangeably engageable in said handle and having a relatively elongated substantially cylindrical shank formed with a radially and axially extending first notch opening through its end, said notch having a generally axially extending third surface and a diametrically extending fourth surface, and the axially inner edge of said third surface being radially inward of its axially outer edge to form a second wedging surface; said shank having a diameter of the order of that of said second relatively small diameter bore; the relative dimensions of said first and second notches being such that, in one angular position of said sleeve, said shank may be inserted through said second relatively small diameter bore to engage its fourth notched surface with the outer end of said cylindrical portion and with said first and second wedging surfaces in spaced parallel relation; said sleeve being rotatable on said handle to a second angular position to displace said shank laterally to firmly interengage said first and second wedging surfaces to releasably lock said shank in said handle; said cylindrical portion having a substantially reduced diameter as compared to the lateral extent of the remainder of said handle; and sleeve means on said handle extending from said one end and terminating at substantially the second surface of said first notch, said sleeve means forming, with said cylindrical portion, a cylindrical recess; said sleeve having a reduced external diameter inner end conformingly fitting in said recess, and having a larger diameter portion abutting the outer end of said sleeve means.

10. A tool for oral surgery comprising, in combination, a relatively elongated handle having a cylindrical portion at one end formed with a radially and axially extending first notch opening axially through said one end, said notch having a generally axially extending first surface and a diametrically extending second surface, and the axially inner edge of said first surface being radially inward of its axially outer edge to form a first wedging surface; a sleeve rotatable on said handle and having a first relatively large diameter bore concentric with and receiving said cylindrical portion, and a second relatively small diameter bore eccentric to said first bore and communicating therewith and circumferentially contiguous with said first bore along one longitudinal generatrix; the relative diameters of said first and second bores being such that said one end of said cylindrical portion extends partially across said second bore; a tool interchangeably engageable in said handle and having a relatively elongated substantially cylindrical shank formed with a radially and axially extending first notch opening through its end, said notch having a generally axially extending third surface and a diametrically extending fourth surface, and the axially inner edge of said third surface being radially inward of its axially outer edge to form a second wedging surface; said shank having a diameter of the order of that of said second relatively small diameter bore; the relative dimensions of said first and second notches being such that, in one angular position of said sleeve, said shank may be inserted through said second relatively small diameter bore to engage its fourth notched surface with the outer end of said cylindrical portion and with said first and second wedging surfaces in spaced parallel relation; said sleeve being rotatable on said handle to a second angular position to displace said shank laterally to firmly interengage said first and second wedging surfaces to releasably lock said shank in said handle; said cylindrical portion having a substantially reduced diameter as compared to the lateral extent of the remainder of said handle; sleeve means on said handle extending from said one end and terminating at substantially the second surface of said first notch, said sleeve means forming, with said cylindrical portion, a cylindrical recess; said sleeve having a reduced external diameter inner end conformingly fitting in said recess; and having a larger diameter portion abutting the outer end of said sleeve means; and cooperating indicia on the external surface of said sleeve means and said enlarged diameter portion of said sleeve aligned when said sleeve is in a position providing for insertion of said shank into said sleeve and extraction of said shank from said sleeve.

11. A tool for oral surgery comprising, in combination, a relatively elongated handle having a cylindrical portion at one end formed with a radially and axially extending first notch opening axially through said one end, said notch having a generally axially extending first surface and a diametrically extending second surface, and the axially inner edge of said first surface being radially inward of its axially outer edge to form a first wedging surface; a sleeve rotatable on said handle and having a first relatively large diameter bore concentric with and receiving said cylindrical portion, and a second relatively small diameter bore eccentric to said first bore and communicating therewith and circumferentially contiguous with said first bore along one longitudinal generatrix; the relative diameters of said first and second bores being such that said one end of said cylindrical portion extends partially across said second bore; and a tool interchangeably engageable in said handle and having a relatively elongated substantially cylindrical shank formed with a radially and axially extending first notch opening through its end, said notch having a generally axially extending third surface and a diametrically extending fourth surface, and the axially inner edge of said third surface being radially inward of its axially outer edge to form a second wedging surface; said shank having a diameter of the order of that of said second relatively small diameter bore; the relative dimensions of said first and second notches being such that, in one angular position of said sleeve, said shank may be inserted through said second relatively small diameter bore to engage its fourth notched surface with the outer end of said cylindrical portion and with said first and second wedging surfaces in spaced parallel relation; said sleeve being rotatable on said handle to a second angular position to displace said shank laterally to firmly interengage said first and second wedging surfaces to releasably lock said shank in said handle; said cylindrical portion being slightly reduced in diameter as compared to the lateral extent of the remainder of said handle; said sleeve having, at its inner end, a cylindrical skirt telescoped over said cylindrical portion and having an outer diameter conforming substantially to the lateral extent of said remainder of said handle; said cylindrical skirt defining said first relatively large diameter bore; said sleeve having a relatively solid outer end engaging the outer end of said cylindrical portion and having said second relatively small diameter bore formed therethrough.

12. An interchangeable tool assembly comprising, in combination, a relatively elongated tool holder having a cylindrical portion at one end formed with a radially and axially extending first notch opening axially through said one end, said notch having a generally axially extending first surface and a diametrically extending second surface, and the axially inner edge of said first surface being radially inward of its axially outer edge to form a first wedging surface; a sleeve rotatable on said holder and having a first relatively large diameter bore concentric with and receiving said cylindrical portion, and a second relatively small diameter bore eccentric to said first bore and communicating therewith and circumferentially contiguous with said first bore along one longitudinal generatrix; the relative diameters of said first and second bores being such that said one end of said cylindrical portion extends partially across said second bore; and a tool interchangeably engageable in said holder and having a relatively elongated substantially cylindrical shank formed with a radially and axially extending first notch opening through its end, said notch having a generally axially extending third surface and a diametrically extending fourth surface, and the axially inner edge of said third surface being radially inward of its axially outer edge to form a second wedging surface; said shank having a diameter of the order of that of said second relatively small diameter bore; the relative radial dimensions of the axially outer ends of said tool holder and said tool being such that, in one angular position of said sleeve, said shank may be inserted through said second relatively small diameter bore and past the axially outer end of said cylindrical portion to engage its fourth notched surface with the outer end of said cylindrical portion and with said first and second wedging surfaces in spaced parallel relation; said sleeve being rotatable on said holder to a second angular position, with said wedging surfaces restraining relative angular displacement of said tool holder and said tool, to displace said shank laterally to firmly interengage said first and second wedging surfaces to releasably lock said shank in said holder.

13. A coupling or chuck, for mounting a tool or the like having a relatively elongated substantially cylindrical shank formed with a radial and axial extending notch opening through its end and having a generally axially extending surface and a diametrically extending surface, with the axially inner edge of the axially extending surface being radially inwardly of its axially outer edge to form a wedging surface: said coupling or chuck comprising, in combination, a first member having a cylindrical portion at one end formed with a radially and axially extending first notch opening axially through said one end, said notch having a generally axially extending first surface and a diametrically extending surface, and the axially inner edge of said first surface being radially inward of its axially outer edge to form a first wedging surface; and a sleeve rotatable on said first member and having a first relatively large diameter bore concentric with and receiving said cylindrical portion, and a second relatively small diameter bore eccentric to said first bore and communicating therewith and circumferentially contiguous with said first bore along one longitudinal generatrix; the relative diameters of said first and second bores being such that said one end of said cylindrical portion extends partially across said second bore; said relatively small diameter bore having a diameter of the order of that of the shank of a tool; the relative radial dimensions of the axially outer ends of said first notch and of the notch in the shank of a tool being such that, in one angular position, with said wedging surfaces restraining relative angular displacement of said first member and said tool, of said sleeve, the shank of a tool may be inserted through said second relatively small diameter bore to engage its notched surface with the outer end of said cylindrical portion, and with said first wedging surface and the wedging surface of the shank of a tool being in spaced parallel relation; said sleeve being rotatable on said first member to a second angular position to displace the shank of a tool laterally to firmly interengage said wedging surfaces to releasably lock the shank of a tool in said first member.

14. A coupling or chuck, for mounting a tool or the like having a relatively elongated substantially cylindrical shank formed with a radially and axially extending notch opening through its end and having a generally axially extending surface and a diametrically extending surface, with the axially inner edge of the axially extending surface being radially inwardly of its axially outer edge to form a wedging surface: said coupling or chuck comprising, in combination, a first member having a cylindrical portion at one end formed with a radially and axially extending first notch opening axially through said one end, said notch having a generally axially extending first surface and a diametrically extending surface, and the axially inner edge of said first surface being radially inwardly of its axially outer edge to form a first wedging surface; and a sleeve rotatable on said first member and having a first relatively large diameter bore concentric with and receiving said cylindrical portion, and a second relatively small diameter bore eccentric to said first bore and communicating therewith and circumferentially contiguous with said first bore along one longitudinal generatrix; the relative diameters of said first and second bores being such that said one end of said cylindrical portion extends partially across said second bore; said relatively small diameter bore having a diameter of the order of that of the shank of a tool; the relative radial dimensions of the axially outer ends of said first notch and of the notch in the shank of a tool being such that, in one angular position of said sleeve, the shank of a tool may be inserted through said second relatively small diameter bore to engage its notched surface with the outer end of said cylindrical portion, and with said first wedging surface and the wedging surface of the shank of a tool being in spaced parallel relation; said sleeve being rotatable on said first member to a second angular position, with said wedging surfaces restraining relative angular displacement of said first member and said tool, to displace the shank of a tool laterally to firmly interengage said wedging surfaces to releasably lock the shank of a tool in said first member, said cylindrical portion comprising a relatively elongated small diameter stem extending from such one end of said first member; said sleeve having a tubular inner end embracing said first member and a relatively solid outer end formed with said first and second bores.

15. A coupling or chuck, for mounting a tool or the like having a relatively elongated substantially cylindrical shank formed with a radial and axial extending notch opening through its end and having a generally axially extending surface and a diametrically extending surface, with the axially inner edge of the axially extending surface being radially inwardly of its axially outer edge to form a wedging surface; said coupling or chuck comprising, in combination, a first member having a cylindrical portion at one end formed with a radially and axially extending first notch opening axially through said one end, said notch having a generally axially extending first surface and a diametrically extending surface, and the axially inner edge of said first surface being radially inward of its axially outer edge to form a first wedging surface; a sleeve rotatable on said first member and having a first relatively large diameter bore concentric with and receiving said cylindrical portion, and a second relatively small diameter bore eccentric to said first bore and communicating therewith and circumferentially contiguous with said first bore along one longitudinal generatrix; the relative diameters of said first and second bores being such that said one end of said cylindrical portion extends partially across said second bore; said relatively small diameter bore having a diameter of the order of that of the shank of a tool; the relative dimensions of said first notch and of the notch in the shank of a tool being such that, in one angular position of said sleeve, the shank of a tool may be inserted through said second relatively small diameter bore to engage its notched surface with the outer end of said cylindrical portion, and with said first wedging surface and the wedging surface of the shank of a tool being in spaced parallel relation; said sleeve being rotatable on said first member to a second angular position to displace the shank of a tool laterally to firmly interengage said wedging surfaces to releasably lock the shank of a tool in said first member; said cylindrical portion having a substantially reduced diameter as compared to the lateral extent of the remainder of said first member; and sleeve means on said first member extending from said one end and terminating at substantially the second surface of said first notch, said sleeve means forming, with said cylindrical portion, a cylindrical recess; said sleeve having a reduced external diameter inner end conformingly fitting in said recess, and having a large diameter portion abutting the outer end of said sleeve means.

References Cited
UNITED STATES PATENTS

| 10,853 | 5/1854 | Allender | 279—81 |
| 492,474 | 2/1893 | Shields | 279—104 |
| 582,413 | 5/1897 | Davis | 279—81 |
| 843,376 | 2/1907 | Tombragel. | |
| 2,122,244 | 6/1938 | Brown | 279—93 |
| 2,208,985 | 7/1940 | Janosko | 279—6 |
| 2,408,567 | 10/1946 | Mauch. | |

HAROLD D. WHITEHEAD, *Primary Examiner.*